United States Patent Office 3,819,665
Patented June 25, 1974

---

3,819,665
ANTHRAQUINONE DYESTUFFS WHICH ARE SPARINGLY SOLUBLE IN WATER
Hans Bosshard, Basel, Switzerland, Michael Diamantoglou, Erlenbach, Germany, and Hans Peter Koelliker, Munchenstein, and Urs Karlen, Magden, Switzerland, assignors to Ciba-Geigy AG, Basel, Switzerland
No Drawing. Filed July 6, 1971, Ser. No. 160,206
Claims priority, application Switzerland, July 6, 1970, 10,162/70
Int. Cl. C09b 1/56
U.S. Cl. 260—376                                    5 Claims

ABSTRACT OF THE DISCLOSURE

Anthraquinone dyestuffs of the formula

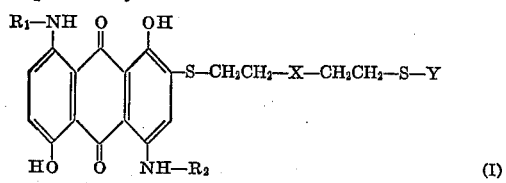

in which $R_1$ and $R_2$ independently of one another each denote hydrogen or a lower alkyl group, X denotes a direct bond, —$CH_2$—, —O— or —S—, and Y denotes the nitrile group, a thiocarboxylic acid ester group, a carbacyl group, or an optionally substituted aliphatic, cycloaliphatic, carbocyclic-aromatic or heterocyclic radical.

The dyestuffs yield fast blue shades on polyester fibers.

---

The present invention relates to new anthraquinone dyestuffs which are sparingly soluble in water and can be used as dispersion dyestuffs, processes for their manufacture, the use of the new anthraquinone dyestuffs for dyeing or printing synthetic organic fibre material, especially textile fibres of linear polyesters of aromatic polycarboxylic acids with polyhydric alcohols or of cellulose esters, and, as an industrial product, the fibre material dyed or printed with the new dyestuffs.

Valuable anthraquinone dyestuffs which are sparingly soluble in water have been discovered, which do not possess any groups which dissociate in water to give an acid reaction and confer solubility in water; these dyestuffs correspond to the following formula I (I)  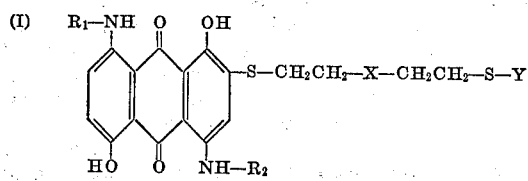

in which $R_1$ and $R_2$ independently of one another each denote hydrogen or a lower alkyl group, X denotes a direct bond —$CH_2$—, —O— or —S—, and Y denotes the nitrile group, a thiocarboxylic acid ester group, a carbacyl group or an optionally substituted aliphatic, cycloaliphatic, carbocyclic-aromatic or heterocyclic radical.

The description "groups which dissociate in water to give an acid reaction and confer solubility in water," which are excluded from the new dyestuffs, used here and in the subsequent text for the known substituents which impart anionic character to the dyestuffs, for example sulphonic acid, carboxylic acid and phosphoric acid groups.

If $R_1$ and $R_2$ denote a lower alkyl group, then this is, for example, the methyl, ethyl, iso-propyl or sec. butyl group; preferably, $R_1$ and $R_2$ represent hydrogen.

X is preferably a direct bond or oxygen.

If Y represents a thiocarboxylic acid ester group, then this is, for example, the thiocarboxylic acid O-phenyl ester group, or preferably a thiocarboxylic acid O-lower alkyl ester group, such as the thiocarboxylic acid O-methyl ester, thiocarboxylic acid O-ethyl ester, thiocarboxylic acid O-isopropyl ester or thiocarboxylic acid O-butyl ester group.

If Y denotes a carbacyl radical, it represents, in particular, a lower unsubstituted or non-ionically substituted alkanoyl group, of which the alkanoyl unit advantageously possesses 2 to 4 carbon atoms. As non-ionic substituents, the alkanoyl group can for example contain halogens, such as chlorine or bromine, or a lower alkoxy group. When Y denotes a carbacyl radical, it can also represent an aroyl radical, especially the benzoyl radical.

If Y represents an aliphatic radical, then this is, for example, a straight-chain or branched-chain, optionally substituted, alkyl or alkenyl group (in the latter case especially a $\Delta^2$-alkenyl group), preferably with 4 carbon atoms. As substituents, these aliphatic radicals, especially the alkyl groups, can, for example, contain halogens, such as chlorine or bromine, a hydroxyl, nitrile, lower alkoxy, lower alkoxycarbonyl, lower alkoxyalkoxycarbonyl or di-lower alkylamino group, and also a carbocyclic ring, such as the cyclohexyl radical, or especially an aromatic ring, such as the phenyl or phenoxy radical, or a heterocyclic ring, such as the thienyl-(2), furyl-(2) or tetrahydrofuryl-(2) radical.

If Y represents a cycloaliphatic radical, cycloalkyl groups with, preferably, 5-membered or 6-membered rings can, for example, be used, and especially the cyclohexyl group.

If Y denotes a carbocyclic-aromatic radical, this radical preferably belongs to the benzene series; it can contain customary non-ionic ring substituents. Nitro groups, lower alkoxy groups, lower alkyl groups, lower alkoxycarbonyl groups or halogens, such as fluorine, chlorine or bromine, may be mentioned as examples of such substituents.

If Y denotes a heterocyclic radical, this radical can be either of aromatic or non-aromatic character; aromatic-heterocyclic radicals are preferably 5-membered or 6-membered and can possess a single hetero-atom or several identical or different hetero-atoms; they can also be condensed, for example with a benzene radical, such as, for example, the triazolyl, tetrazolyl, 2- or 4-pyridyl, 2-quinolinyl, 2-pyrimidyl, 1,3,4-triazinyl, 2-benzoxazolyl, or 2-benzthiazolyl radical, which can possess customary non-ionic ring substituents. Amongst the non-aromatic heterocyclic radicals, 5-membered or 6-membered radicals are again preferred; the 2-thiazolinyl, the 2-imidazolinyl and the 2-(6-methyl-penthiazolinyl) radicals may be mentioned.

In preferred anthraquinone dyestuffs of the formula I, Y denotes the nitrile group, a lower alkyl group substituted by a lower alkoxycarbonyl group, a thiocarboxylic acid lower alkyl ester group or a phenyl radical which is optionally substituted by halogen or by a lower alkyl group.

In the preceding text, the term "lower" in the context of alkyl or alkoxy groups denotes radicals of this nature which have not more than 5 carbon atoms.

The new anthraquinone dyestuffs of the formula I are obtained by oxidising an anthraquinone compound of the formula II

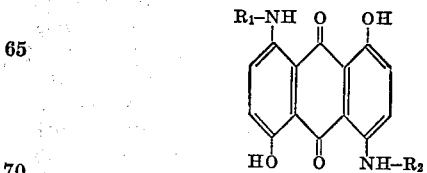

in which $R_1$ and $R_2$ have the meaning indicated under formula I, to the corresponding quinone-imine compound, adding to this, in a strongly acid medium, a cyclic sulphide of the formula III

in which X has the meaning indicated under formula I, and reacting the resulting sulphonium compound of the formula IV

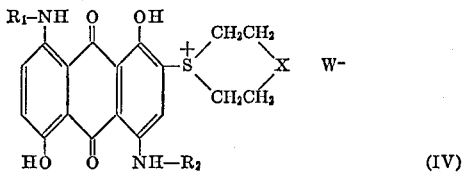

in which $R_1$, $R_2$ and X have the meaning indicated under formula I and W denotes the charge equivalent of an inorganic anion, in the presence of a proton acceptor, with a mercapto compound of the formula V

in which Y has the meaning indicated under formula I, to give an anthraquinone dyestuff of the formula I, the starting substances being so chosen that the final dyestuff does not possess any groups which dissociate in water to give an acid reaction and confer solubility in water.

Suitable 1,5-dihydroxy-4,8-diamino-anthraquinones of the formula II for carrying out this process are, for example, 1,5-dihydroxy-4,8-diamino-anthraquinone, 1,5-dihydroxy - 4,8 - bismethylamino-anthraquinone, 1,5-dihydroxy - 4,8 - bisethylamino-anthraquinone and 1,5-dihydroxy-4,8-bis-isopropylamino-anthraquinone.

Examples of cyclic sulphides which can be used as starting substances are: tetrahydrothiophene, tetrahydrothiapyrane, 1,4-dithiane and 1,4-oxathiane (thioxane).

The oxidation of 1,5-dihydroxy-4,8-diamino-anthraquinone compounds of the formula II to give the corresponding quinone-imines capable of addition takes place according to methods which are in themselves known, in acid solution or suspension, for example in 60 to 100% strength sulphuric acid, using oxidising agents, such as manganese dioxide, lead dioxide, chromic acid, nitric acid, lead tetraacetate or potassium persulphate, at temperatures of 0 to 30° C.

The reaction oft he quinone-imines of 1,4-dihydroxy-5,8-diamino-anthraquinones of the formula II with the sulphide compounds of the formula III to give the sulphonium salts of the formula IV is appropriately carried out in a strongly acid medium at temperatures of —5 to 15° C., and sulphuric acid, pyrosulphuric acid, phosphoric acid, polyphosphoric acid or hydrofluoric acid can be used as acids.

Preferably, aqueous sulphuric acid, especially 60 to 85% strength aqueous sulphuric acid, is used as the strongly acid medium.

Equivalent quantities of the starting substances, or a 5 to 10% excess of cyclic sulphide, are used for the reaction. The acid is appropriately present in excess, since it simultaneously serves as the solvent.

The sulphonium compounds produced in this reaction precipitate directly as sulphates or phosphates on diluting the acid solution, for example containing sulphuric acid or phosphoric acid, with ice water, and can be isolated by filtration.

As examples of mercapto compounds of the formula V which can be used according to the invention there may be mentioned, inter alia:

methylmercaptan,
ethylmercaptan,
propylmercaptan,
isopropylmercaptan,
octylmercaptan,
dodecylmercaptan,
β-hydroxyethylmercaptan,
γ-hydroxypropylmercaptan,
β-methoxyethylmercaptan,
β-ethoxyethylmercaptan,
γ-methoxypropylmercaptan,
γ-ethoxypropylmercaptan,
benzylmercaptan,
β-phenylethylmercaptan,
γ-phenylpropylmercaptan,
δ-phenylbutylmercaptan,
β-phenoxy-ethylmercaptan,
γ-phenoxy-propylmercaptan,
β-propionylethylmercaptan,
cyclohexylmercaptan,
thioglycollic acid methyl ester,
thioglycollic acid ethyl ester,
thioglycollic acid isopropyl ester,
thioglycollic acid cyclohexyl ester,
thiophenol,
p-thiocresol,
2,5-dimethylthiophenol,
2,6-dimethylthiophenol,
2,4,6-trimethylthiophenol,
2-ethylthiophenol,
4-isopropylthiophenol,
4-n-butylthiophenol,
4-tert.-butylthiophenol,
4-trifluoromethylthiophenol,
2-chloro-4-propylthiophenol,
4-methoxythiophenol,
3-bromo-4-butoxythiophenol,
4-nonylthiophenol,
4-dodecylthiophenol,
4-chloro-thiophenol,
4-bromothiophenol,
3,4- or 3,5-dichlorothiophenol,
4-fluorothiophenol,
4-phenoxythiophenol,
4-phenylthiophenol,
3-ethoxycarbonylthiophenol,
3-butoxycarbonylthiophenol,
4-(β-methoxyethyl)-thiophenol,
4-(β-isopropoxybutyl)-thiophenol,
4-butoxymethylthiophenol,
4-(β-hydroxyethyl)-thiophenol,
4-(β-hydroxyethoxy)-thiophenol,
3-nitro-thiophenol,
4-ethoxycarbonyl-methylthiophenol,
2-mercaptopyridine,
4-mercaptopyridine,
2-methyl-4-mercaptopyridine,
6 mercaptoquinoline,
8-mercaptoquinoline,
2-mercaptopyrimidine,
2-mercapto-thiazolidine,
2-mercaptobenzthiazole,
2-mercaptobenzoxazole and
5-mercapto-1-phenyltriazole, as well as potassium thiocyanate and potassium xanthate.

Possible proton acceptors are, for example: alkali metal and alkaline earth metal oxides and hydroxides, such as sodium hydroxide, potassium hydroxide, calcium hydroxide, magnesium oxide or barium oxide; alkali metal salts of weak organic and inorganic acids, such as sodium acetate, potassium acetate, sodium benzoate, sodium salicylate, potassium hydrogen carbonate, potassium carbonate, sodium carbonate, sodium borate, disodium phosphate or trisodium phosphate; tertiary aliphatic or cycloaliphatic amines, such as triethylamine or quinuclidine; heterocyclic tertiary nitrogen bases, such as pyridine and quinoline bases or their mixtures, such as pyridine, α-, β- or γ-methylpyridine, lutidine, collidine, 2-methyl-5-ethylpyridine, quinoline, quinaldine, lepidine or isoquinoline; or N,N-dialkylaminobenzenes, such as N,N-dimethyl- or N,N-diethylaminobenzene. Preferred proton acceptors are sodium carbonate or potassium hydrogen carbonate.

The reaction of the sulphonium compounds of the formula IV with the mercapto compound of the formula V takes place with splitting of the sulphonium ring, advantageously by introducing the mercapto compound into an aqueous suspension of the sulphonium compound, which also contains the proton acceptor, and thereafter warming the reaction mixture at temperatures of 20 to 100° C., preferably 40 to 60° C. Relative to the sulphonium compound, the mercapto compound should be present in at least equimolar amount and the proton acceptor in at least twice the equimolar amount, but preferably an excess of both of these components is used.

After completion of the reaction, the dyestuff of the formula I which is formed is filtered from the settled-out suspension, washed and dried.

The new anthraquinone dyestuffs of the formula I are deeply coloured crystalline substances which are sparingly soluble in water. They can be obtained in an analytically pure form by recrystallisation from organic solvents, but such a purification is in general not necessary for their use for dyeing.

They are suitable for dyeing or printing synthetic organic fibre material, for example for dyeing fibre material which consists of linear high molecular esters of aromatic polycarboxylic acids with polyhydric alcohols, such as polyethylene glycol terephthalate or poly-(1,4)-cyclohexanedimethylol terephthalate, and for dyeing fibre material of cellulose diacetate, cellulose 2½-acetate or cellulose triacetate. These dyestuffs can however also be used for dyeing synthetic polyamide fibres, such as, for example, polyhexamethylene adipamide, polycaprolactam or polyaminoundecanoic acid, and for dyeing polyolefines, especially polypropylene fibres. Furthermore, depending on the composition, they are suitable for bulk dyeing or pigmenting of lacquers, oils and waxes, as well as cellulose derivatives, especially cellulose esters, such as cellulose acetate, or polyamides.

The dyeing of the said fibre materials with the sparingly water-soluble anthraquinone dyestuffs according to the invention preferably takes place from aqueous dispersion. It is therefore advisable finely to divide the end substances of formula I which can be used as dispersion dyestuffs, by grinding them with dispersing agents and possibly further grinding auxiliaries.

Suitable organic dispersing agents for the purpose are, for example, the alkylarylsulphonates, the condensation products of formaldehyde with naphthalenesulphonic acid, and the ligninsulphonates; suitable non-ionic dispersing agents for the purpose are, for example, fatty alcohol- or alkylphenyl-polyglycol-ethers with a higher alkyl radical.

The dyeing of the polyester fibres with the sparingly water-soluble dyestuffs according to the invention from aqueous dispersion takes place in accordance with the processes which are customary for polyester materials. Polyesters of aromatic polycarboxylic acids with polyhydric alcohols are preferably dyed at temperatures above 100° C., under pressure. Dyeing can, however, also be carried out at the boiling point of the dye bath, in the presence of dyestuff carriers, for example phenylphenols, polychlorobenzene compounds, or similar auxiliaries, or according to the thermosol process, that is to say padding with a subsequent hot after-treatment, for example thermofixing, at 180–210° C. Cellulose 2½-acetate fibres are preferably dyed at temperatures of 80–85° C., whilst cellulose triacetate fibres are advantageously dyed at the boiling point of the dye bath. When dyeing cellulose 2½-acetate or polyamide fibres, the use of dyestuff carriers is superfluous. Anthraquinone dyestuffs according to the invention can also be used for printing the said materials according to customary methods.

The anthraquinone dyestuffs of the formula I which can be used as dispersion dyestuffs have very good affinity for the abovementioned synthetic organic fibre material, especially for polyethylene glycol terephthalate fibres, and give strong blue dyeings thereof, which are fast to light, washing, rubbing, perspiration, sublimation, solvents and decatising. Mixtures of anthraquinone dyestuffs according to the invention also behave very advantageously in this respect.

Furthermore, anthraquinone dyestuffs according to the invention can also be employed very successfully in mixtures with other dispersion dyestuffs which are fast to sublimation, for dyeing textile material by the padding-thermofixing process. The fact that dyestuffs of the Formula I, on dyeing tightly constructed polyester fabrics or tightly twisted polyester yarns give uniform dyeings throughout is also particularly noteworthy. Furthermore, the new dyestuffs of the formula I possess the valuable property of making it possible to obtain very deep, non-streaky dyeings on texturised polyester fibres, for example "Crimplene," and these dyeings furthermore possess good fastness, particularly fastness to rubbing and sublimation. The new anthraquinone dyestuffs also show very good stability in the liquor and in their stability to boiling-down.

The examples which follow illustrate the invention.

Example 1

28.6 g. of 1,5-dihydroxy-4,8-diamino-anthraquinone are dissolved in 270 ml. of 96% strength sulphuric acid at 20–30° C. The resulting solution is cooled to 0–5° C. and is treated with 18 g. of manganese dioxide added in portions over the course of 30 minutes. The deep blue solution of the quinone-imine formed is then filtered and the residue is washed with 180 ml. of 96% strength sulphuric acid. The solution is thereafter diluted with water at 10° C. to 60–70% sulphuric acid content. Thereafter 10 g. of tetrahydrothiophene are added dropwise to the solution over the course of 20 minutes, at 0–5° C. After 40 minutes, the reaction is practically complete. The resulting yellow solution is subsequently mixed with 1 litre of water at 15° C., whereupon the sulphonium compound of the formula

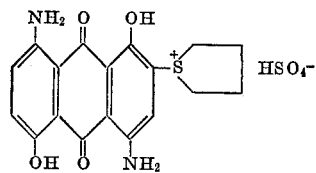

separates out in the crystalline form. It is filtered off and washed with ice water. Whilst still moist, the sulphonium compound is suspended in 1 litre of ice water, and the suspension is adjusted to pH 7–8 with 10% strength sodium carbonate solution and mixed with 15.9 g. of thioglycollic acid methyl ester. The reaction mixture is warmed to 50° C. over the course of 40 minutes and kept at this temperature, whilst constantly adjusting the pH value to 7–8 with 10% strength sodium carbonate solution. The dyestuff obtained, of the formula

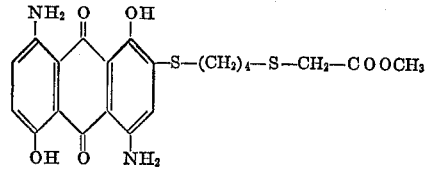

is filtered off, washed with water and methanol and dried in vacuo at 50–60° C.

After grinding with ligninsulphonate, this dyestuff dyes fibres of cellulose diacetate and cellulose triacetate, and especially of polyethylene glycol terephthalate, in pure blue shades from aqueous dispersion. The dyeings have good fastness to sublimation and to rubbing.

If instead of 28.6 g. of 1,5-dihydroxy-4,8-diaminoanthraquinone equivalent amounts of one of the anthraquinone compounds indicated in the following Table 1, column II, are used, and instead of the 15.9 g. of thioglycollic acid methyl ester, equivalent amount of one of the mercapto compounds indicated in column III of the same table are used, and in other respects the same procedure as indicated in the example is followed, the corresponding final dyestuffs listed in column IV are obtained, which dye polyethylene glycol terephthalate fibres in blue colour shades having similar properties.

separates out in a crystalline form. It is filtered off and washed with ice water.

The moist sulphonium compound is thereafter suspended in 1 litre of water, and the suspension is adjusted to pH 7–8 with 10% strength sodium carbonate solution and is mixed with a solution of 22 g. of thiophenol and 8 g. of sodium hydroxide in 100 g. of water. The reaction mixture is warmed to 50–55° C. over the course of 25 minutes. After half an hour, the reaction is practically complete.

TABLE 1

| I Ex. No. | II Anthraquinone compound $R_1$ | $R_2$ | III Mercapto compound | IV Dyestuff of the formula $R_1$ | $R_2$ | Y |
|---|---|---|---|---|---|---|
| 2 | H | H | HS—CH$_2$COO—CH$_3$ | H | H | —CH$_2$—COO—CH$_3$ |
| 3 | H | H | HS—CH$_2$COOC$_2$H$_5$ | H | H | —CH$_2$COOC$_2$H$_5$ |
| 4 | H | H | HS—CH$_2$COOC$_4$H$_9$ | H | H | —CH$_2$COOC$_4$H$_9$ |
| 5 | H | H | HS—CH$_2$COOC$_6$H$_{13}$ | H | H | —CH$_2$COOC$_6$H$_{13}$ |
| 6 | H | H | HS—CH$_2$CH$_2$—OH | H | H | —CH$_2$CH$_2$—OH |
| 7 | H | H | HS—CH$_3$ | H | H | —CH$_3$ |
| 8 | H | H | HS—C$_6$H$_5$ | H | H | —C$_6$H$_5$ |
| 9 | H | H | HS—C$_6$H$_4$—CH$_3$ | H | H | —C$_6$H$_4$—CH$_3$ |
| 10 | H | H | HS—C$_6$H$_4$—C(CH$_3$)$_3$ | H | H | —C$_6$H$_4$—C(CH$_3$)$_3$ |
| 11 | H | H | KS—CN | H | H | —CN |
| 12 | H | H | KS—CSOC$_2$H$_5$ | H | H | —CSOC$_2$H$_5$ |
| 13 | H | H | HS—C(=N—CH$_2$—CH$_2$—S) (thiazoline) | H | H | —C(=N—CH$_2$—CH$_2$—S) |
| 14 | H | H | HS—C(=N)—N=CH—N—C$_6$H$_5$ (triazole) | H | H | —C(=N)—N=CH—N—C$_6$H$_5$ |
| 15 | CH$_3$ | CH$_3$ | HS—C$_6$H$_5$ | CH$_3$ | CH$_3$ | —C$_6$H$_5$ |
| 16 | CH$_3$ | CH$_3$ | HS—CH$_2$COOCH$_3$ | CH$_3$ | CH$_3$ | —CH$_2$COOCH$_3$ |
| 17 | CH$_3$ | CH$_3$ | HS—C$_6$H$_4$—NO$_2$ | CH$_3$ | CH$_3$ | —C$_6$H$_4$—NO$_2$ |
| 18 | CH$_3$ | CH$_3$ | HS—C$_6$H$_4$—OCH$_3$ | CH$_3$ | CH$_3$ | —C$_6$H$_4$—OCH$_3$ |

Example 19

28.6 g. of 1,5-dihydroxy-4,8-diaminoanthraquinone are oxidised with 18 g. of manganese dioxide as indicated in Example 1, after which the deep blue solution of the quinone-imine formed is diluted with water to 60–70% sulphuric acid content. 11.5 g. of 1,4-oxathiane are added dropwise, at 0–5° C., to the diluted solution. After one hour the solution, which has changed to yellow, is diluted with 1 litre of water at 15° C.

The sulphonium compound of the formula

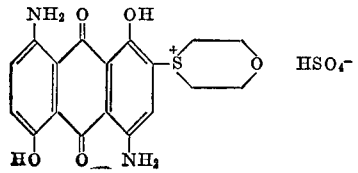   HSO$_4^-$

The dyestuff which has separated out, of the formula

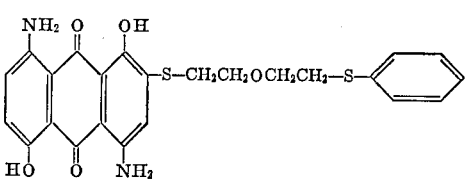

is filtered off, washed with water and methanol and dried in vacuo at 50–60° C.

The dyestuff obtained is a blue powder, which after grinding with a dispersing agent dyes cellulose diacetate and cellulose triacetate fibres and especially polyethylene glycol terephthalate fibres is clear blue shades from aqueous dispersion. The dyeings have good fastness to sublimation and to rubbing.

If instead of 28.6 g. of 1,5-dihydroxy-4,8-diaminoanthraquinone equivalent amounts of one of the anthraquinone compounds indicated in the following Table 2, column II are used, and instead of the 22 g. of thiophenol equivalent amounts of one of the mercapto compounds indicated in column III of the same table are used, and in other respects the same procedure as indicated in the example is followed, the corresponding dyestuffs listed in column IV are obtained, which dye polyethylene glycol terephthalate fibres in blue colour shades having similar properties.

TABLE 2

Column II: Anthraquinone compound of formula with $R_1$–NH, O, OH, HO, O, NH–$R_2$ substituents.

Column IV: Dyestuff of the formula with $R_1$–NH, O, OH, S–$C_2H_4$–O–$C_2H_4$–S–Y, HO, O, NH–$R_2$ substituents.

| Ex. No. | $R_1$ | $R_2$ | Mercapto compound | $R_1$ | $R_2$ | Y |
|---|---|---|---|---|---|---|
| 20 | H | H | HS—$CH_2CH_3$ | H | H | —$CH_2CH_3$ |
| 21 | H | H | HS-n-$C_3H_7$ | H | H | —n-$C_3H_7$ |
| 22 | H | H | HS-n-$C_4H_9$ | H | H | —n-$C_4H_9$ |
| 23 | H | H | HS-n-$C_5H_{11}$ | H | H | —n-$C_5H_{11}$ |
| 24 | H | H | HS-n-$C_6H_{13}$ | H | H | —n-$C_6H_{13}$ |
| 25 | H | H | HS—$CH_2CH_2OH$ | H | H | —$CH_2CH_2OH$ |
| 26 | H | H | HS—$CH_2COOCH_3$ | H | H | —$CH_2COOCH_3$ |
| 27 | H | H | HS—$CH_2COOC_2H_5$ | H | H | —$CH_2COOC_2H_5$ |
| 28 | H | H | HS—$CH_2COOC_4H_9$ | H | H | —$CH_2COOC_4H_9$ |
| 29 | H | H | HS—$CH_2COOC_2H_4OCH_3$ | H | H | —$CH_2COOC_2H_4OCH_3$ |
| 30 | H | H | HS—$CH_2COOC_6H_{13}$ | H | H | —$CH_2COOC_6H_{13}$ |
| 31 | H | H | HS—$CH_2CH_2N(CH_3)_2$ | H | H | —$CH_2CH_2N(CH_3)_2$ |
| 32 | H | H | HS—$CH_2CH_2N(C_2H_5)_2$ | H | H | —$CH_2CH_2N(C_2H_5)_2$ |
| 33 | H | H | KS—CN | H | H | —CN |
| 34 | H | H | KS—$CSOC_2H_5$ | H | H | —$CSOC_2H_5$ |
| 35 | H | H | HS—$COCH_3$ | H | H | —$COCH_3$ |
| 36 | H | H | HS—C$_6$H$_4$—$CH_3$ (para) | H | H | —C$_6$H$_4$—$CH_3$ (para) |
| 37 | H | H | HS—C$_6$H$_4$—$CH_3$ (meta) | H | H | —C$_6$H$_4$—$CH_3$ (meta) |
| 38 | H | H | HS—C$_6$H$_3$(Cl)(Cl) | H | H | —C$_6$H$_3$(Cl)(Cl) |
| 39 | H | H | HS—C$_6$H$_4$—Cl (meta) | H | H | —C$_6$H$_4$—Cl (meta) |
| 40 | H | H | HS—C$_6$H$_4$—$C_9H_{19}$ | H | H | —C$_6$H$_4$—$C_9H_{19}$ |
| 41 | H | H | HS—$CH_2CH_2CH_2$—C$_6$H$_5$ | H | H | —$CH_2CH_2CH_2$—C$_6$H$_5$ |
| 42 | H | H | HS—$CH_2$—C$_6$H$_5$ | H | H | —$CH_2$—C$_6$H$_5$ |
| 43 | H | H | HS—C$_6$H$_4$—H | H | H | —C$_6$H$_4$—H |
| 44 | H | H | HS—$CH_2CH_2CH_2$O—C$_6$H$_5$ | H | H | —$CH_2CH_2CH_2$O—C$_6$H$_5$ |
| 45 | H | H | HS—$CH_2$COO—C$_6$H$_4$—H | H | H | —$CH_2$COO—C$_6$H$_4$—H |
| 46 | H | H | HS—pyridyl | H | H | —pyridyl |
| 47 | H | H | HS—pyrimidyl | H | H | —pyrimidyl |

TABLE 2—Continued

| | I | II | III | IV | | |
|---|---|---|---|---|---|---|
| | Anthraquinone compound | | | Dyestuff of the formula | | |
| Ex. No. | $R_1$ | $R_2$ | Mercapto compound | $R_1$ | $R_2$ | Y |
| 48 | H | H | HS-C(=N-CH₂-CH₂-S) | H | H | -C(=N-CH₂-CH₂-S) |
| 49 | CH₃ | CH₃ | HS-C₆H₅ | CH₃ | CH₃ | -C₆H₅ |
| 50 | CH₃ | CH₃ | HS—CH₂CH₃ | CH₃ | CH₃ | —CH₂CH₃ |
| 51 | CH₃ | CH₃ | HS—CH₂CH₂CH₂—C₆H₅ | CH₃ | CH₃ | —CH₂CH₂CH₂—C₆H₅ |
| 52 | CH₃ | H | KS—CN | CH₃ | H | —CN |
| 53 | CH₃ | H | KS—COCH₃ | CH₃ | H | —COCH₃ |
| 54 | C₂H₅ | H | KS—CN | C₂H₅ | H | —CN |
| 55 | C₂H₅ | H | KS—CSOC₂H₅ | C₂H₅ | H | —CSOC₂H₅ |
| 56 | C₂H₅ | H | KS—CH₂COOCH₃ | C₂H₅ | H | —CH₂COOCH₃ |
| 57 | H | H | HS-C(benzimidazole) | H | H | -C(benzimidazole) |
| 58 | H | H | HS-C(benzoxazole) | H | H | -C(benzoxazole) |

Example 59

28.6 g. of 1,5-dihydroxy-4,8-diamino-anthraquinone are oxidised with 18 g. of manganese dioxide as indicated in Example 1. The deep blue solution of the quinone-imine obtained is diluted with water to 60–70% sulphuric acid content and treated with 13.3 g. of 1,4-dithiane. After one hour, 1 litre of water is poured into the solution at 15° C., whereupon the sulphonium compound of the formula

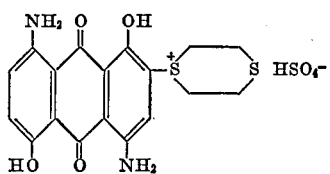

precipitates in a crystalline form. It is filtered off and washed with ice water.

The sulphonium compound, whilst still moist, is suspended in 1 litre of ice water, and the suspension is adjusted to pH 7–8 with 10% strength sodium carbonate solution and treated with 19.4 g. of potassium thiocyanate. Thereafter, the reaction mixture is warmed to 40–50° C. for one hour. The dyestuff which has separated out, of the formula

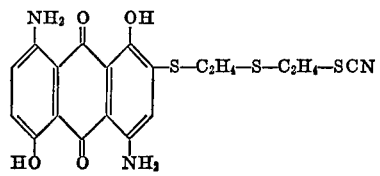

is filtered off, washed with water and methanol and dried in vacuo.

The resulting dyestuff is a blue powder which after grinding with a dispersing agent dyes cellulose diacetate and cellulose triacetate fibres and especially polyethylene glycol terephthalate fibres in clear blue shades from aqueous dispersion. The dyeings have good fastness to sublimation and rubbing.

If instead of 28.6 g. of 1,5-dihydroxy-4,8-diamino-anthraquinone equivalent amounts of one of the anthraquinone compounds indicated in the following Table 2, column II are used, and instead of the 19.4 g. of potassium thiocyanate in equivalent amounts of one of the mercapto compounds indicated in column III of the same table are used, and in other respects the same procedure as indicated in the example is followed, the corresponding dyestuffs listed in column IV are obtained, which dye polyethylene glycol terephthalate fibres in blue colour shades having similar properties.

TABLE 3

| I | II | III | | IV | | |
|---|---|---|---|---|---|---|
| | Anthraquinone compound | | | Dyestuff of the formula | | |
| | $R_1$—NH O OH | | | $R_1$—NH O OH | | |
| | (structure with HO O NH—$R_2$) | | | (structure with —S—$C_2H_4$—S—$C_2H_4$—S—Y; HO O NH—$R_2$) | | |
| Example number | $R_1$ | $R_2$ | Mercapto compound | $R_1$ | $R_2$ | Y |
| 60 | H | H | KS—$CSOC_2H_5$ | H | H | —$CSOC_2H_5$ |
| 61 | H | H | HS—$COCH_3$ | H | H | —$COCH_3$ |
| 62 | H | H | HS—$CH_2COOC_2H_5$ | H | H | —$CH_2COOC_2H_5$ |
| 63 | H | H | HS—$CH_2CH_2OH$ | H | H | —$CH_2CH_2OH$ |
| 64 | H | H | HS—(phenyl) | H | H | —(phenyl) |
| 65 | H | H | HS—C(benzothiazole) | H | H | —C(benzothiazole) |
| 66 | $CH_3$ | $CH_3$ | KS—$CSOC_2H_5$ | $CH_3$ | $CH_3$ | —$CSOC_2H_5$ |
| 67 | $CH_3$ | $CH_3$ | HS—$CH_2COOC_2H_5$ | $CH_3$ | $CH_3$ | —$CH_2COOC_2H_5$ |
| 68 | $CH_3$ | $CH_3$ | HS—(phenyl) | $CH_3$ | $CH_3$ | —(phenyl) |

EXAMPLE 69

28.6 g. of 1,5-dihydroxy-4,8-diamino-anthraquinone are oxidised with 19 g. of manganese dioxide as indicated in Example 1. The deep blue solution of the resulting quinone-imine is diluted with water to 60–70% sulphuric acid content and mixed with 11.3 g. of tetrahydrothiapyrane. After one hour, 1 litre of water is poured into the solution at 15° C., whereupon the sulphonium compound of the formula

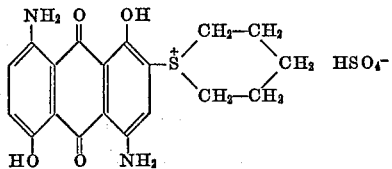

precipitates. It is filtered off and washed with ice water.

The moist sulphonium compound is suspended in 1 litre of ice water, and the suspension is adjusted to pH 7–8 with 10% strength sodium carbonate solution and is mixed with 19.4 g. of potassium thiocyanate. Thereafter, the reaction mixture is warmed to 40–50° C. for one hour. The dyestuff of the formula

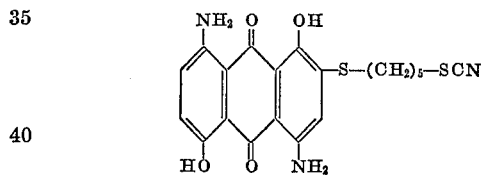

which has separated out is filtered off, washed with water and methanol and dried in vacuo.

If instead of 19.4 g. of potassium thiocyanate equivalent amounts of one of the mercapto compounds indicated in the following Table 4, column II, are used, and in other respects the same procedure as indicated in the example is followed, the corresponding dyestuffs listed in column III are obtained, which dye polyethylene glycol terephthalate fibres in blue colour shades having similar properties.

TABLE 4

| I | II | III |
|---|---|---|
| | | Dyestuff of the formula |
| | | $H_2N$ O OH (structure) —S—$(CH_2)_5$—S—Y; HO O $NH_2$ |
| Example number | Mercapto compound | Y |
| 70 | KS—$CSOC_3H_7$ | —$CSOC_3H_7$ |
| 71 | HS—$CH_2COOCH_3$ | —$CH_2COOCH_3$ |
| 72 | HS—(phenyl)—$CH_3$ | —(phenyl)—$CH_3$ |
| 73 | HS—$CH_2CH_3$ | —$CH_2CH_3$ |
| 74 | HS—$CH_2CH_2CH_2$—(phenyl) | —$CH_2CH_2CH_2$—(phenyl) |
| 75 | KS—$CSOCH_3$ | —$CSOCH_3$ |
| 76 | KS—$SCSOC_4H_9$ | —$SCSOC_4H_9$ |

Example 77

2 g. of the dyestuff obtained according to Example 27 are dispersed in 4000 g. of water. 12 g. of sodium salt of o-phenylphenol, as a swelling agent, and 12 g. of diammonium phosphate are added to this dispersion, and 100 g. of polyethylene glycol terephthalate yarn are dyed for 1½ hours at 95–98° C. The dyeing is rinsed and aftertreated with aqueous sodium hydroxide solution and a dispersing agent.

An intensely coloured blue dyeing which is fast to light and to sublimation is thus obtained.

If, in the above example, the 100 g. of polyethylene glycol terephthalate yarn are replaced by 100 g. of cellulose triacetate fabric, dyeing is carried out under the conditions indicated, and the fabric is subsequently rinsed with water, an intensely coloured blue dyeing of very good fastness to washing and sublimation is obtained.

Example 78

2 g. of dyestuff obtained according to Example 34 are finely suspended in 2000 g. of water, containing 4 g. of oleyl-polyglycol-ether, in a pressure dyeing apparatus. The pH-value of the dyebath is adjusted to 4–5 with acetic acid.

100 g. of polyethylene glycol terephthalate fabric are now introduced at 50° C., the bath is heated to 140° C. over the course of 30 minutes, and dyeing is carried out for 50 minutes at this temperature. The dyeing is subsequently rinsed with water, soaped and dried. If these conditions are observed, an intensely coloured, level blue dyeing which is fast to perspiration, light and sublimation is obtained.

The dyestuffs described in the other examples give dyeings of equivalent quality by this process.

Example 79

Polyethylene glycol terephthalate fabric is impregnated on a padder, at 40° C., with a liquor of the following composition:

20 g. of the dyestuff obtained according to Example 19, finely dispersed in
- 7.5 g. of sodium alginate,
- 20 g. of triethanolamine,
- 20 g. of octylphenol-polyglycol-ether and
- 900 g. of water.

The fabric is squeezed out to approx. 100%, dried at 100° C., and subsequently fixed over the course of 30 seconds at a temperature of 210° C. The dyed goods are rinsed with water, soaped and dried. Under these conditions, an intensely coloured blue dyeing which is fast to rubbing, light and sublimation is obtained.

The dyestuffs described in the other examples give dyeings of equivalent quality by this process.

We claim:

1. An anthraquinone dyestuff of the formula

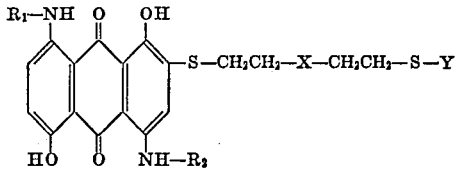

wherein $R_1$ and $R_2$ independently of each other denote hydrogen or lower alkyl, X denotes a direct bond,

—$CH_2$—,

—O— or —S—, and Y denotes (1) substituted lower alkyl wherein the substituent is selected from the group of lower alkoxy carbonyl and lower alkoxy lower alkoxy carbonyl, or (2) phenyl substituted by lower alkoxy carbonyl.

2. Anthraquinone dyestuff according to claim 1, in which $R_1$ and $R_2$ denote hydrogen.

3. Anthraquinone dyestuff according to claim 1, in which X denotes the direct bond or oxygen.

4. An anthraquinone dyestuff according to claim 1 wherein Y denotes lower alkoxy carbonyl lower alkyl.

5. The anthraquinone dyestuff having the formula

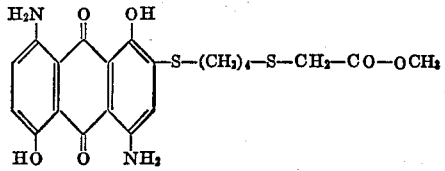

References Cited

UNITED STATES PATENTS 3,538,129  11/1970  Sato et al. _____ 260—376

LORRAINE A. WEINBERGER, Primary Examiner

E. J. SKELLY, Assistant Examiner

U.S. Cl. X.R.

8—39, 40; 260—249, 256.5 R, 272, 303, 307.5, 308 R, 308 D, 309.6, 327 P, 327 TH, 329.2, 347.2, 380